(12) United States Patent
Kim et al.

(10) Patent No.: US 12,034,183 B2
(45) Date of Patent: Jul. 9, 2024

(54) BATTERY MODULE, BATTERY PACK COMPRISING BATTERY MODULE, AND VEHICLE COMPRISING BATTERY PACK

(71) Applicant: LG Chem, Ltd., Seoul (KR)

(72) Inventors: Kyung-Mo Kim, Daejeon (KR); Jeong-O Mun, Daejeon (KR); Jin-Yong Park, Daejeon (KR); Ho-June Chi, Daejeon (KR); Seung-Joon Kim, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 714 days.

(21) Appl. No.: 17/265,690

(22) PCT Filed: Sep. 9, 2019

(86) PCT No.: PCT/KR2019/011653
§ 371 (c)(1),
(2) Date: Feb. 3, 2021

(87) PCT Pub. No.: WO2020/067659
PCT Pub. Date: Apr. 2, 2020

(65) Prior Publication Data
US 2021/0194099 A1    Jun. 24, 2021

(30) Foreign Application Priority Data

Sep. 28, 2018 (KR) .................. 10-2018-0116525

(51) Int. Cl.
*H01M 50/505*    (2021.01)
*H01M 50/209*    (2021.01)
(Continued)

(52) U.S. Cl.
CPC ....... *H01M 50/505* (2021.01); *H01M 50/209* (2021.01); *H01M 50/211* (2021.01);
(Continued)

(58) Field of Classification Search
CPC .. H01M 50/505; H01M 50/249; H01M 50/50; H01M 50/262; H01M 50/209;
(Continued)

(56) References Cited

U.S. PATENT DOCUMENTS

2007/0207377 A1    9/2007    Han et al.
2011/0223466 A1    9/2011    Lee et al.
(Continued)

FOREIGN PATENT DOCUMENTS

CN    105280851 B    2/2018
CN    210489710 U    5/2020
(Continued)

OTHER PUBLICATIONS

Search Report for European Application No. 19864862.8 dated Aug. 27, 2021. 2 pgs.
(Continued)

*Primary Examiner* — Jane J Rhee
(74) *Attorney, Agent, or Firm* — Lerner David LLP (57) ABSTRACT

A battery module includes a plurality of battery cells, a base frame configured to support the plurality of battery cells, a cover frame coupled to the base frame to cover the plurality of battery cells, and a bus bar unit coupled to the cover frame in a tiltable manner so as to be pivotable between a first location fixed to the cover frame and a second location fixed to the base frame, where the first location is oriented at a predetermined angle relative to the second location.

10 Claims, 10 Drawing Sheets

(51) Int. Cl.
*H01M 50/211* (2021.01)
*H01M 50/249* (2021.01)
*H01M 50/262* (2021.01)
*H01M 50/271* (2021.01)
*H01M 50/291* (2021.01)
*H01M 50/50* (2021.01)

(52) U.S. Cl.
CPC ....... *H01M 50/249* (2021.01); *H01M 50/262* (2021.01); *H01M 50/271* (2021.01); *H01M 50/291* (2021.01); *H01M 50/50* (2021.01); *H01M 2220/20* (2013.01)

(58) Field of Classification Search
CPC ............. H01M 50/211; H01M 50/291; H01M 50/271; H01M 2220/20
See application file for complete search history.

(56) References Cited

U.S. PATENT DOCUMENTS

| | | | |
|---|---|---|---|
| 2013/0309553 | A1 | 11/2013 | Kinoshita et al. |
| 2015/0270666 | A1 | 9/2015 | Callicoat et al. |
| 2016/0197463 | A1 | 7/2016 | Alefelder et al. |
| 2016/0372736 | A1 | 12/2016 | Kim et al. |
| 2019/0001838 | A1 | 1/2019 | Choi et al. |
| 2019/0389318 | A1 | 12/2019 | Lee et al. |

FOREIGN PATENT DOCUMENTS

| | | | |
|---|---|---|---|
| EP | 3331059 | A1 | 6/2018 |
| JP | 2012512516 | A | 5/2012 |
| JP | 2014022195 | A | 2/2014 |
| JP | 2014179237 | A | 9/2014 |
| KR | 20070025391 | A | 3/2007 |
| KR | 20100070170 | A | 6/2010 |
| KR | 20150109726 | A | 10/2015 |
| KR | 20170028647 | A | 3/2017 |
| KR | 20170084500 | A | 7/2017 |
| KR | 10-20170094981 | A | 8/2017 |
| KR | 101844852 | B1 | 4/2018 |
| KR | 20180038253 | A | 4/2018 |
| KR | 101842515 | B1 | 5/2018 |
| KR | 20180099438 | A | 9/2018 |

OTHER PUBLICATIONS

International Search Report for PCT Application No. PCT/KR2019/011653 dated Jan. 2, 2020.

BATTERY MODULE, BATTERY PACK COMPRISING BATTERY MODULE, AND VEHICLE COMPRISING BATTERY PACK

CROSS-REFERENCE TO RELATED APPLICATIONS

The present application is a national phase entry under 35 U.S.C. § 371 of International Application No. PCT/KR2019/011653 filed Sep. 9, 2019, which claims priority from Korean Patent Application No. 10-2018-0116525 filed on Sep. 28, 2018, the disclosures of which are incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing environmental friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

When the battery module or the battery pack is configured, it is an important factor in product productivity and price competitiveness to increase the efficiency of the assembling process. Recently, as the demand for high-capacity battery cells has increased, the demand for battery modules and battery packs is rapidly increasing. Thus, in order to secure market competitiveness of products, it is required to find a way to enhance the efficiency of the assembling process for the battery modules or the battery packs.

DISCLOSURE

Technical Problem

The present disclosure is directed to providing a battery module, which may improve the efficiency of an assembling process, a battery pack including the battery module, and a vehicle including the battery pack.

Technical Solution

In one aspect of the present disclosure, there is provided a battery module, comprising: a plurality of battery cells; a base frame configured to support the plurality of battery cells; a cover frame coupled to the base frame to cover the plurality of battery cells; and a bus bar unit coupled to the cover frame in a tiltable form to be pivoted at a predetermined angle between a first location fixed to the cover frame and a second location fixed to the base frame.

The bus bar unit may include a bus bar housing pivotally coupled to the cover frame and fixed to the base frame; and a connection bus bar provided to the bus bar housing and connected to electrode leads of the plurality of battery cells.

The bus bar housing may have a tension stopper that is caught at the first location by a bottom portion of the cover frame to make the bus bar housing be spaced apart from the base frame at a predetermined angle.

The tension stopper may include a protrusion configured to protrude from the bus bar housing by a predetermined length; a first bent portion bent from the protrusion to contact a bottom surface of the cover frame at the first location and be spaced apart from the bottom surface of the cover frame at the second location; and a second bent portion bent from the first bent portion to be spaced apart from the bottom surface of the cover frame at the first location and to be disposed in contact with or adjacent to the bottom surface of the cover frame at the second location.

The bus bar housing may have a guide projection formed to guide disposition positioning of the bus bar housing at the second location The cover frame may have a guide groove into which the guide projection is inserted when the bus bar unit is pivoted from the first location toward the second location.

The bus bar housing may have a fixing hook formed to fix the bus bar housing to the base frame at the second location.

The base frame may have a hook insert groove into which the fixing hook is inserted at the second location.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiments.

Advantageous Effects

According to various embodiments as above, it is possible to provide a battery module, which may improve the efficiency of an assembling process, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
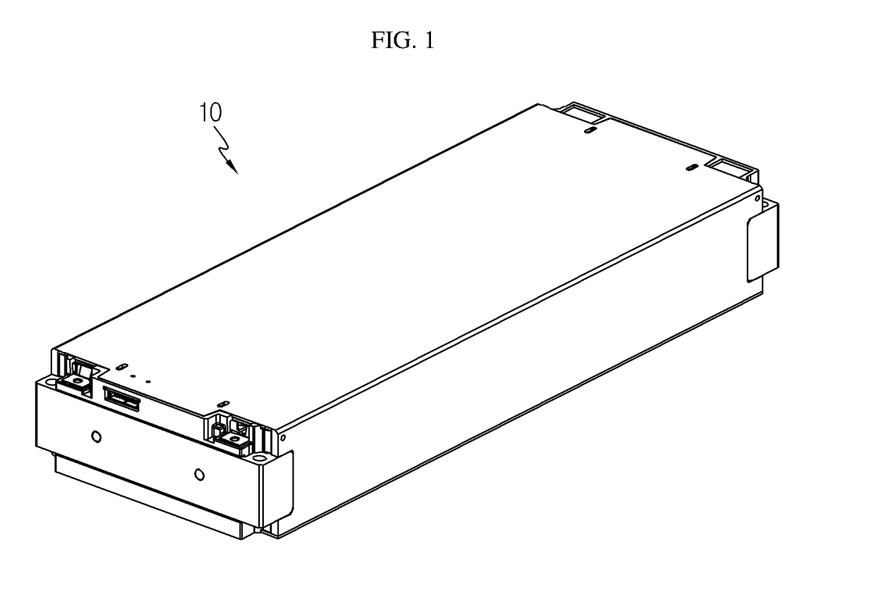
FIG. 1 is a perspective diagram for illustrating a battery module according to an embodiment of the present disclosure.
Figure 2:
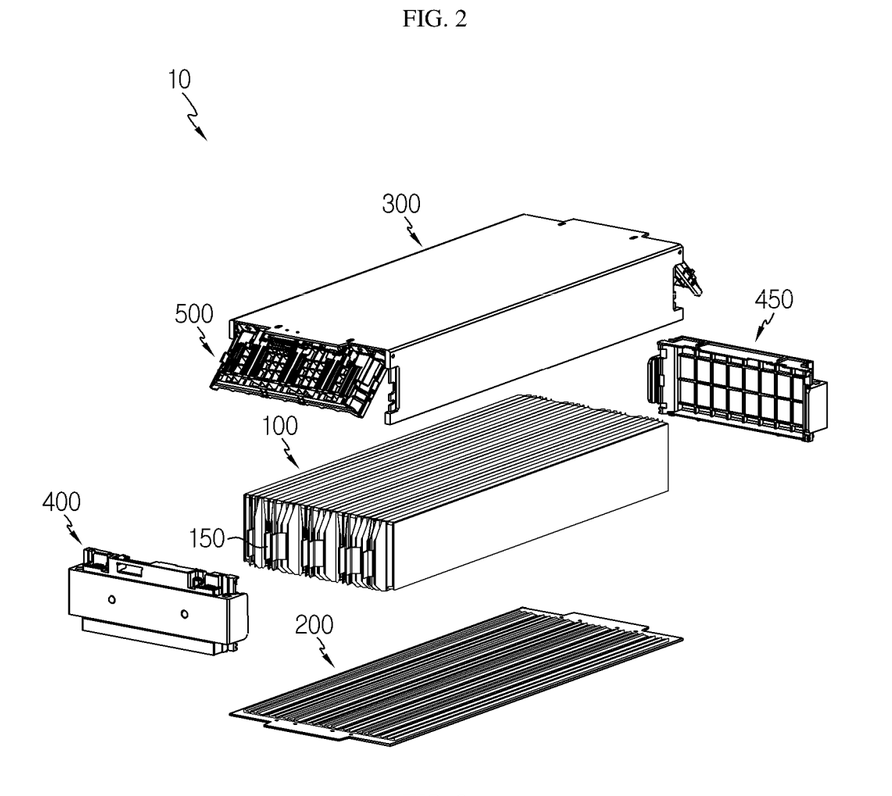
FIG. 2 is an exploded perspective view showing the battery module of FIG. 1.
Figure 3:
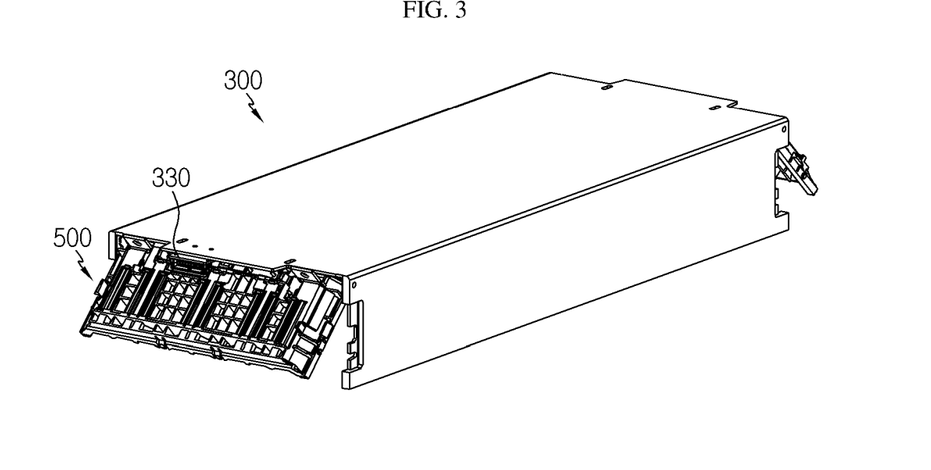
FIGS. 3 and 4 are diagrams for illustrating a process of coupling a cover frame and a bus bar unit of the battery module of FIG. 2.
Figure 4:
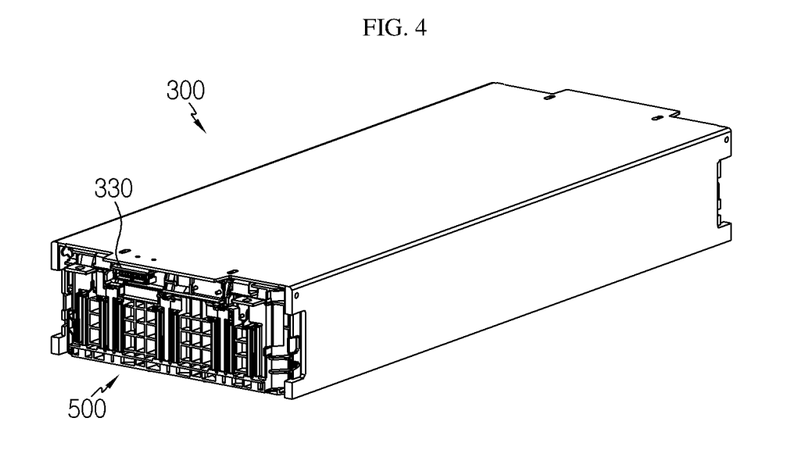
Figure 5:
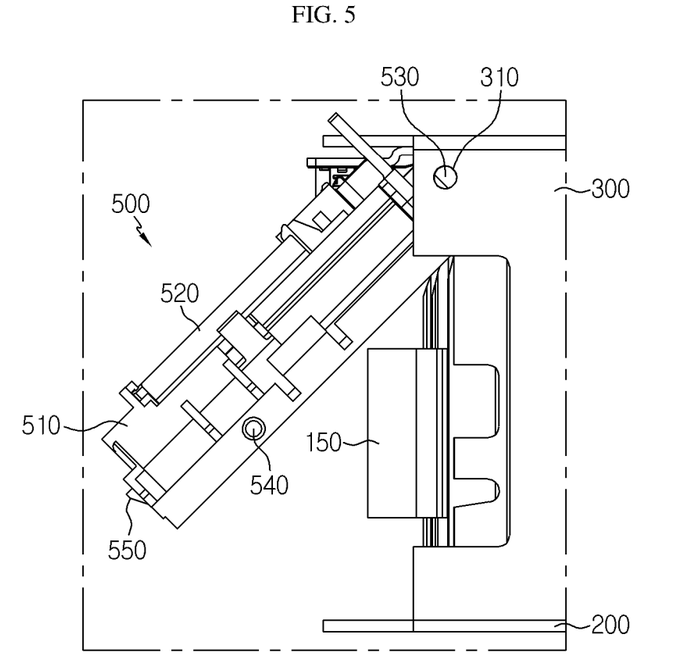
FIG. 5 is a diagram for illustrating a disposed form of the bus bar unit of FIG. 3 at a first location.
Figure 6:
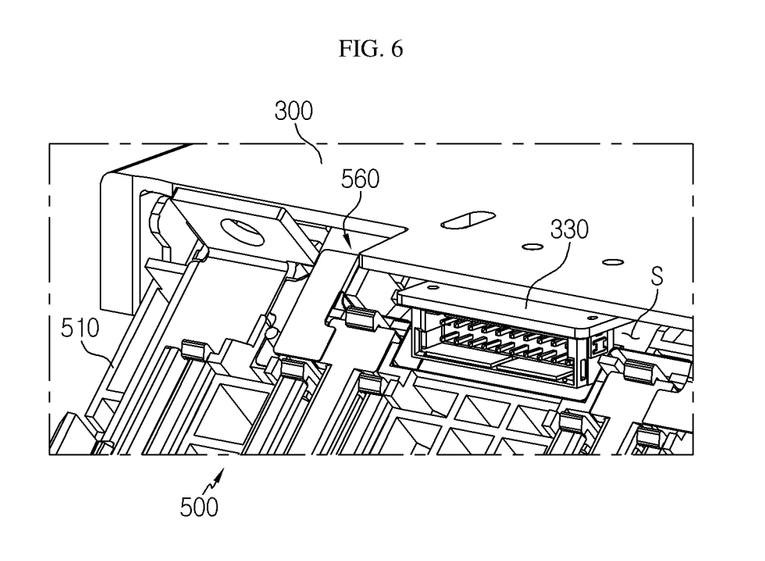
FIGS. 6 and 7 are diagrams for illustrating a tension stopper of the bus bar unit of FIG. 5.
Figure 7:
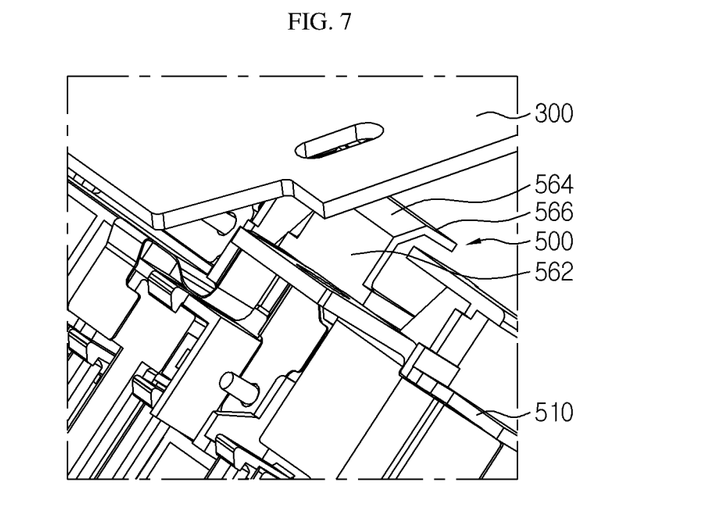

FIG. 1 is a perspective diagram for illustrating a battery module according to an embodiment of the present disclosure, FIG. 2 is an exploded perspective view showing the battery module of FIG. 1, FIGS. 3 and 4 are diagrams for illustrating a process of coupling a cover frame and a bus bar unit of the battery module of FIG. 2, FIG. 5 is a diagram for illustrating a disposed form of the bus bar unit of FIG. 3 at a first location, FIGS. 6 and 7 are diagrams for illustrating a tension stopper of the bus bar unit of FIG. 5, and FIGS. 8 to 10 are diagrams for illustrating a disposed form of the bus bar unit of FIG. 3 at a second location.

Referring to FIGS. 1 to 10, the battery module 10 may include a battery cell 100, a base frame 200, a cover frame 300, a front cover 400, a rear cover 450 and a bus bar unit 500.

The battery cell 100 is a secondary battery and may be any one of a pouch-type secondary battery, a rectangular secondary battery and a cylindrical secondary battery. Hereinafter, in this embodiment, the battery cell 100 is described as a pouch-type secondary battery.

The battery cell 100 may be provided in plural. The plurality of battery cells 100 may be stacked on each other to be electrically connected to each other. The plurality of battery cells 100 may be electrically connected by means of the connection of electrode leads 150 of the plurality of battery cells 100 and a bus bar unit 500, explained later.

The base frame 200 is to support the plurality of battery cells 100 and may support a bottom portion of the plurality of battery cells 100. A top surface of the base frame 200 may have a shape corresponding to a bottom surface of the plurality of battery cells 100. Accordingly, the plurality of battery cells 100 may be stably supported on the top surface of the base frame 200.

The base frame 200 may have a hook insert groove 210.

The hook insert groove 210 is to stably fix the bus bar housing 510 of the bus bar unit 500, explained later, at a second location, explained later, and may be provided at front and rear ends of the base frame 200.

The hook insert groove 210 may be provided solely or in plural. Hereinafter, in this embodiment, the hook insert groove 210 may be provided in plural, and the plurality of hook insert grooves 210 may be disposed to be spaced apart from each other by a predetermined distance.

The cover frame 300 may be coupled to the base frame 200 to cover the plurality of battery cells 100. The cover frame 300 may cover an upper side and both sides of the plurality of battery cells 100.

The cover frame 300 may have a rotation guide groove 310.

The rotation guide groove 310 is provided at both side ends of the cover frame 300 and may guide the pivoting of the bus bar unit 500, explained later. A rotation shaft projection 530 of the bus bar unit 500, explained later, may be mounted into the rotation guide groove 310.

The cover frame 300 may have a connector 330.

The connector 330 is to connect the battery module 10 to an external power source or electric component and may be provided on a front inner wall of the cover frame 300.

The cover frame 300 may have a guide groove 350.

The guide groove 350 may be provided at both side ends of the cover frame 300. A guide projection 540, explained later, may be inserted into the guide groove 350, when the bus bar unit 500, explained later, is pivoted from a first location, explained later, to a second location, explained later.

The front cover 400 covers a front portion of the bus bar unit 500 and may form a front surface of the battery module 10. The rear cover 450 covers a rear portion of the bus bar unit 500 and may form a rear surface of the battery module 10.

The bus bar unit 500 electrically connects the plurality of battery cells 100 and may be coupled to the cover frame 300 in a tiltable form to be pivoted at a predetermined angle between a first location fixed to the cover frame 300 at a predetermined angle and a second location fixed to the base frame 200.

In this embodiment, the first location may mean a location at which the bus bar housing 510 of the bus bar unit 500, explained later, is fixed at a predetermined angle from the cover frame 300, and the second location may mean a location at which the bus bar housing 510, explained later, is fixed to the base frame 200.

Hereinafter, the bus bar unit 500 according to this embodiment will be described in more detail.

The bus bar unit 500 may include a bus bar housing 510, a connection bus bar 520, and a rotation shaft projection 530.

The bus bar housing 510 is pivotally coupled to the cover frame 300 and may be fixed to the base frame 200. The bus bar housing 510 may cover the front and rear sides of the plurality of battery cells 100.

The connection bus bar 520 is provided to the bus bar housing 510 and may be connected to the electrode leads 150 of the plurality of battery cells 100. The connection bus bar 520 may be provided in plural, and the plurality of connection bus bars 520 may be mounted to the bus bar housing 510 to be spaced apart from each other by a predetermined distance.

The rotation shaft projection 530 is provided at both sides of the top portion of the bus bar housing 510 and may be pivotally inserted into the rotation guide groove 310 of the cover frame 300.

The bus bar unit 500 may have a guide projection 540.

The guide projection 540 is provided to a side surface of the bus bar housing 510 and may guide the disposition positioning of the bus bar housing 510 at the second location. The guide projection 540 may be inserted into the guide groove 350 to guide the bus bar housing 510 to be assembled at an accurate location.

The bus bar unit 500 may have a fixing hook 550.

The fixing hook 550 is to fix the bus bar housing 510 to the base frame 200 at the second location and may be provided to a bottom portion of the bus bar housing 510.

The fixing hook 550 may be provided solely or in plural.

The bus bar unit 500 may have a tension stopper 560.

The tension stopper 560 is provided to the bus bar housing 510 and may be caught by the bottom portion of the cover frame 300 at the first location to make the bus bar housing 510 be spaced apart from the base frame 200 at a predetermined angle.

The tension stopper 560 may include a protrusion 562, a first bent portion 564, and a second bent portion 566.

The protrusion 562 is provided to the top surface of the bus bar housing 510 and may protrude from the top surface of the bus bar housing 510 by a predetermined length.

The first bent portion 564 may be bent from the protrusion 562 to contact the bottom surface of the cover frame 300 at the first location and may be spaced apart from the bottom surface of the cover frame 300 at the second location.

The second bent portion 566 may be bent from the first bent portion 564 to be spaced apart from the bottom surface of the cover frame 300 at the first location and to contact or be disposed adjacent to the bottom surface of the cover frame 300 at the second location.

Hereinafter, the rotating operation of the bus bar unit 500 between the first location and the second location will be described in detail.

First, at the first location (see FIG. 5), the bus bar housing 510 may be fixed to be spaced apart from the cover frame 300 at a predetermined angle to keep the front and rear portions of the cover frame 300 open at a predetermined size.

The bus bar housing 510 may be fixed disposed at a predetermined angle by means of the tension stopper 560. As shown in FIG. 7, at the first location, the first bent portion 564 of the tension stopper 560 is in close contact with the inner wall of the cover frame 300, thereby preventing the bus bar housing 510 from moving.

In this embodiment, since the bus bar housing 510 is fixedly disposed at a predetermined angle without movement at the first location, when the cover frame 300 and the base frame 200 are assembled, it is possible to prevent the electrode lead 150 of the battery cells 100 and other components from being damaged or broken.

Thus, in this embodiment, the cover frame 300 and the base frame 200 may be assembled with each other more accurately. For this reason, the plurality of battery cells 100 disposed inside the cover frame 300 and the base frame 200 may be assembled at more accurate locations, and it is possible to effectively prevent electrical components or the electrode leads 150 near the bus bar housing 510 from being broken during the assembling process.

Figure 8:
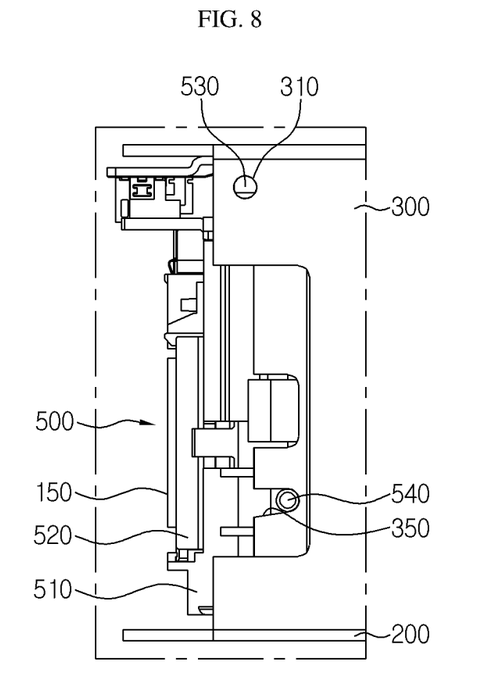
FIGS. 8 to 10 are diagrams for illustrating a disposed form of the bus bar unit of FIG. 3 at a second location.
Figure 9:
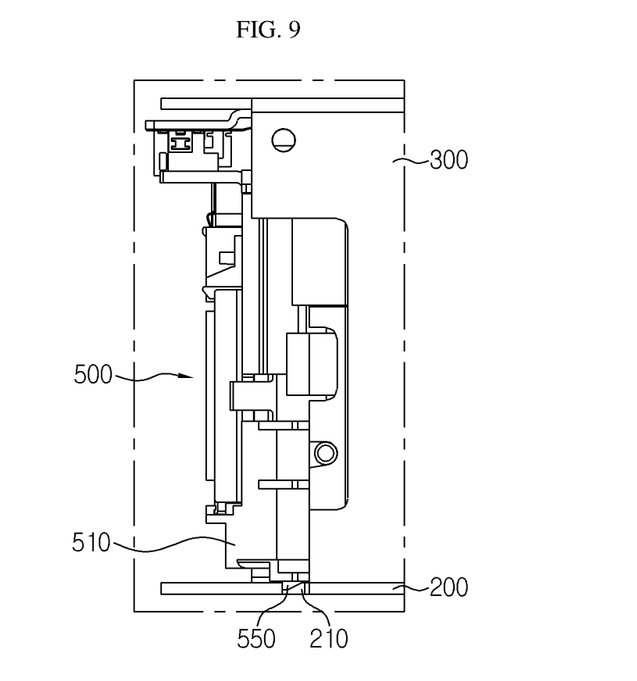
Figure 10:
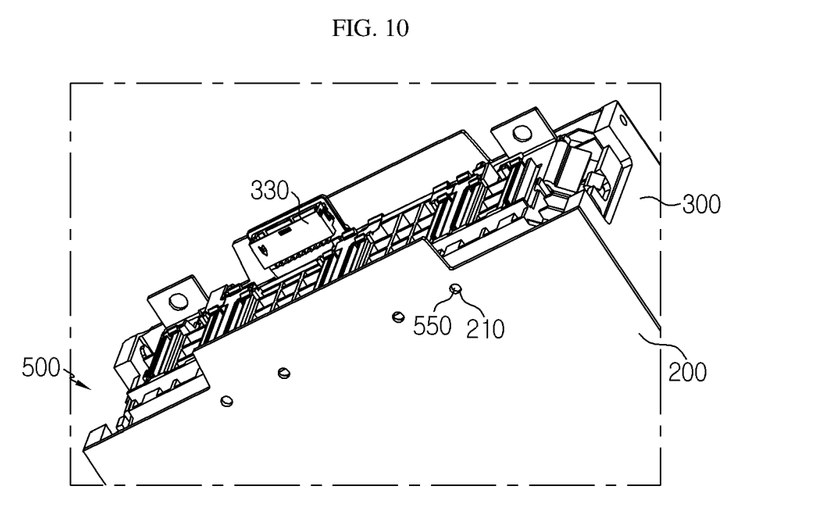

After the battery cells 100 are accurately disposed inside the cover frame 300 and the base frame 200, a manufacturer or the like may pivot the bus bar housing 510 so that the bus bar housing 510 of the bus bar housing 500 may be disposed at the second location (see FIG. 8).

After that, the manufacturer or the like may electrically connect the connection bus bars 520 of the bus bar unit 500 and the electrode leads 150 of the battery cells 100.

When the bus bar housing 510 is pivoted from the first location to the second location, the guide projection 540 may be inserted into the guide groove 350 of the cover frame 300 to guide the bus bar housing 510 to be arranged at an accurate location.

When the bus bar housing 510 is pivoted from the first location to the second location, the tension stopper 560 is also pivoted together. Thus, the first bent portion 564 of the tension stopper 560 may be spaced apart from the inner wall of the cover frame 300, and the second bent portion 566 may be disposed in contact with or adjacent to the inner wall of the cover frame 300.

In addition, the fixing hook 550 of the bus bar housing 510 may be inserted into the hook insert groove 210 of the base frame 200 according to the pivoting to fix the bus bar housing 510 at the second location.

Meanwhile, the bus bar housing 510 is disposed to form a separated space S of a predetermined size with the connector 330 provided to the cover frame 300 (see FIG. 6), thereby causing no interference problem with the connector 330 during the pivoting.

FIGS. 11 to 16 are diagrams for illustrating an assembling process of the battery module of FIG. 1.

Figure 11:
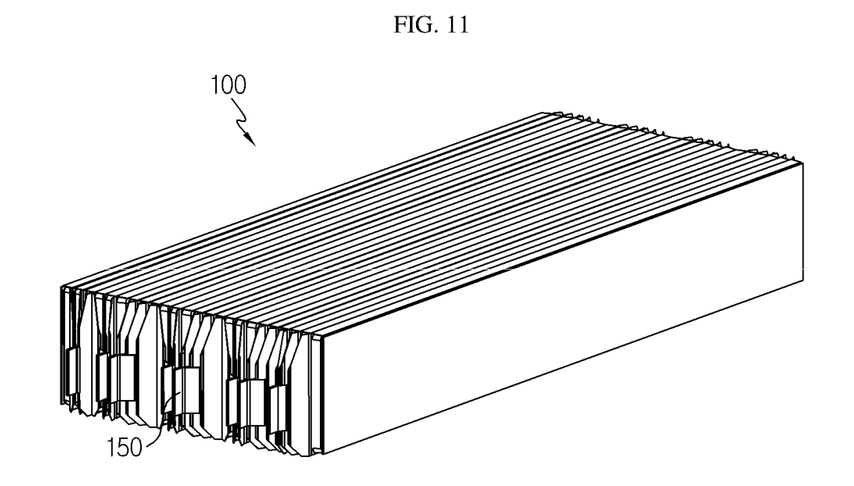
FIGS. 11 to 16 are diagrams for illustrating an assembling process of the battery module of FIG. 1.
Figure 12:
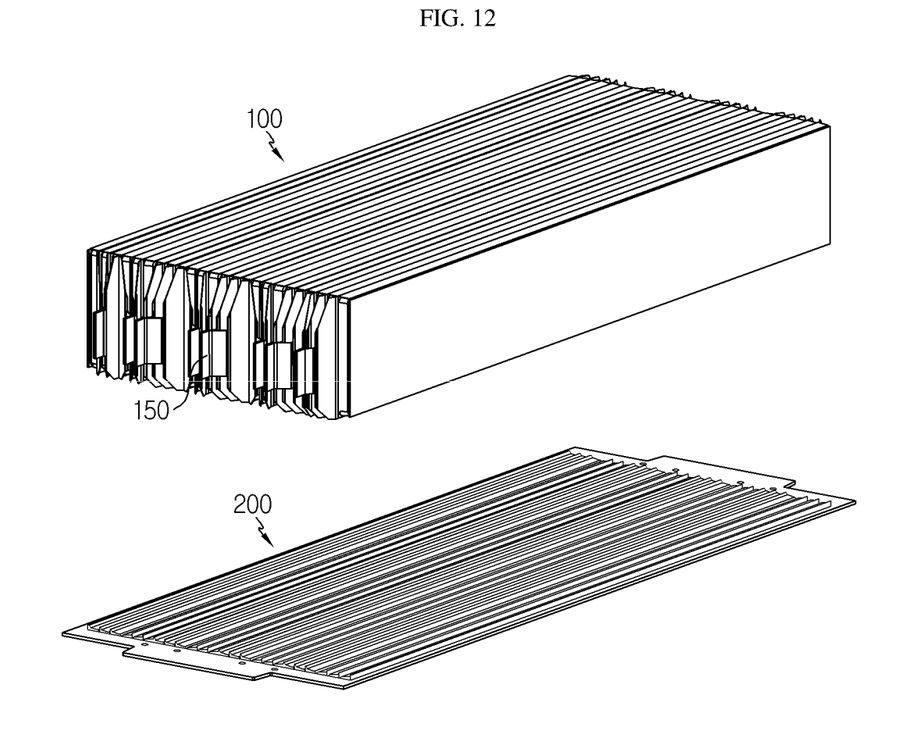

Referring to FIG. 11, first, the manufacturer or the like may stack the plurality of battery cells 100 side by side in a predetermined direction. Referring to FIG. 12, the manufacturer or the like may place the plurality of battery cells on the base frame 200.

Figure 13:
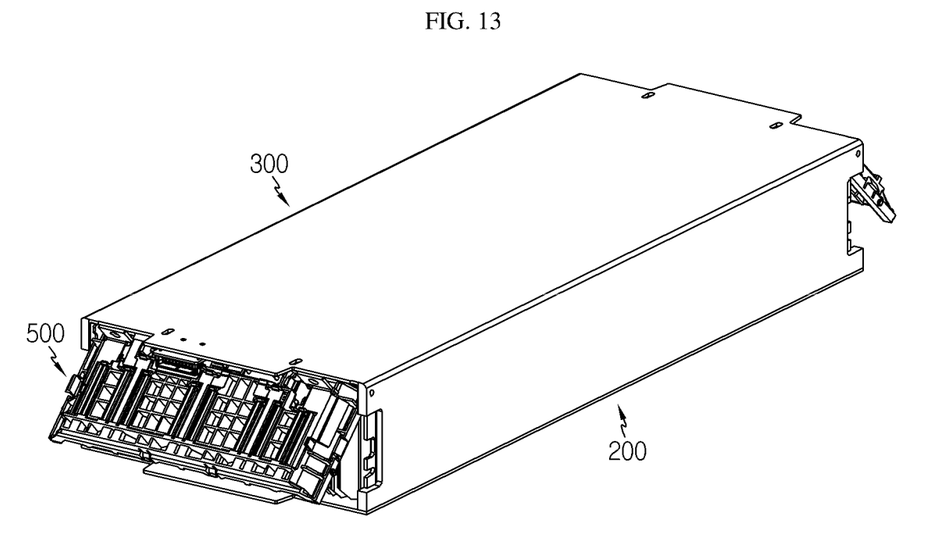

Referring to FIG. 13, the manufacturer or the like may mount the cover frame 300 to the base frame 200 to cover the upper side and both sides of the plurality of battery cells 200.

At this time, since the bus bar unit 500 coupled to the cover frame 300 is disposed to be fixed at a predetermined angle without movement, the manufacturer or the like may easily assemble the cover frame 300 to the base frame 200 without any interference problem caused by the movement or the like of the bus bar unit 500.

Figure 14:
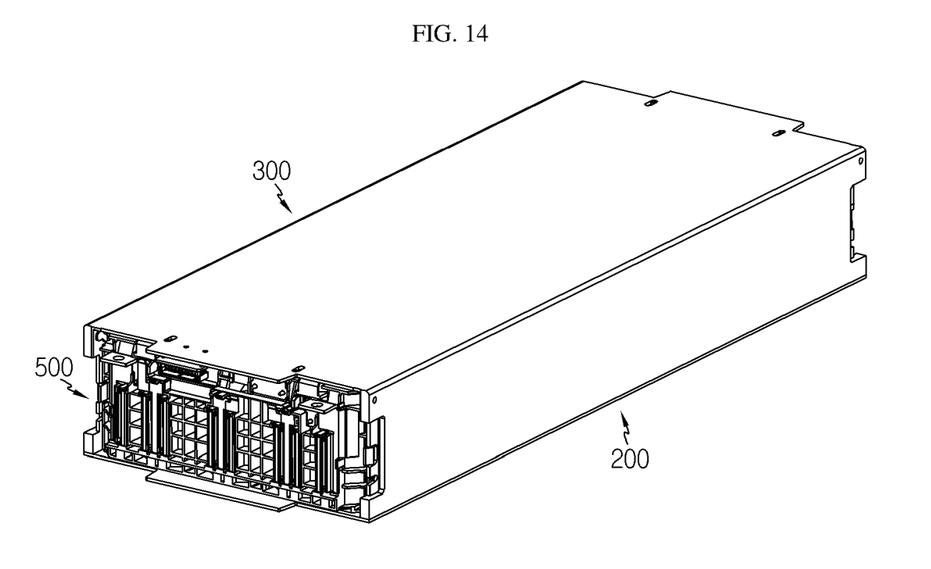

Referring to FIG. 14, if the cover frame 300 and the base frame 200 are completely assembled, the manufacturer or the like may pivot the bus bar unit 500 to electrically connect the electrode leads 150 from the battery cells 100 (see FIG. 11) to the bus bar unit 500.

Figure 15:
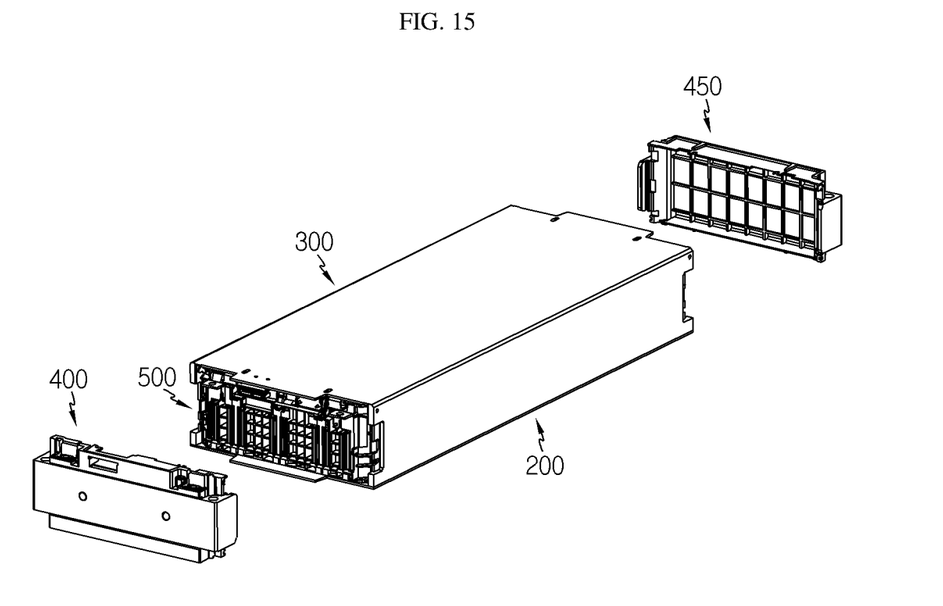

Referring to FIG. 15, after that, the manufacturer or the like may mount the front cover 400 and the rear cover 450 to cover the front and rear sides of the bus bar unit 500.

Figure 16:
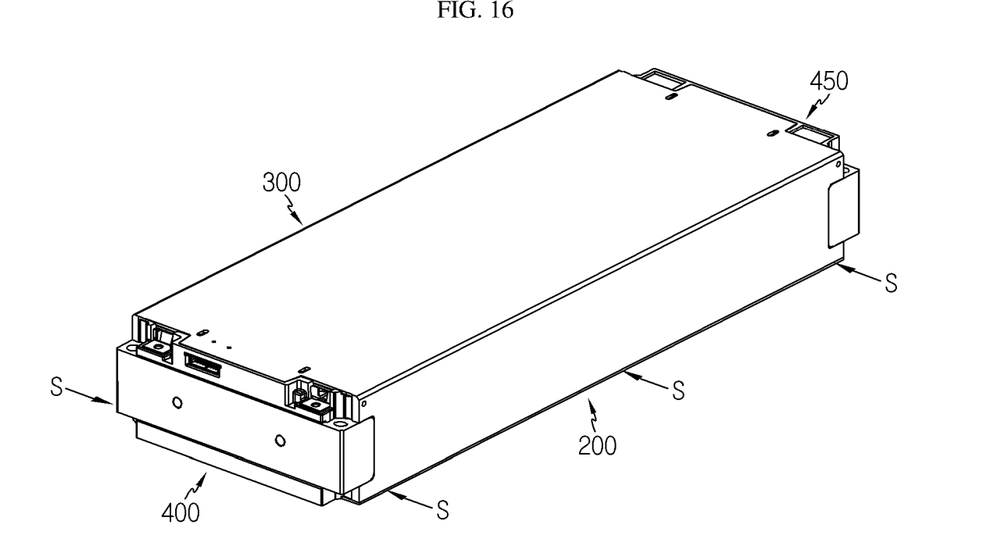

Referring to FIG. 16, if the front cover 400 and the rear cover 450 are completely mounted, the manufacturer or the like may finally couple the base frame 200, the cover frame 300, the front cover 400 and the rear cover 450 by means of welding S or the like, so that the battery cells 100 (see FIG. 11) and the bus bar unit 500 (see FIG. 15) are hermetically packaged.

As described above, in this embodiment, the assembling process of the battery module 10 may be performed without interference between components coupled to each other during the assembling process of the battery module 10, thereby significantly improving the efficiency of the assembling process.

Figure 17:
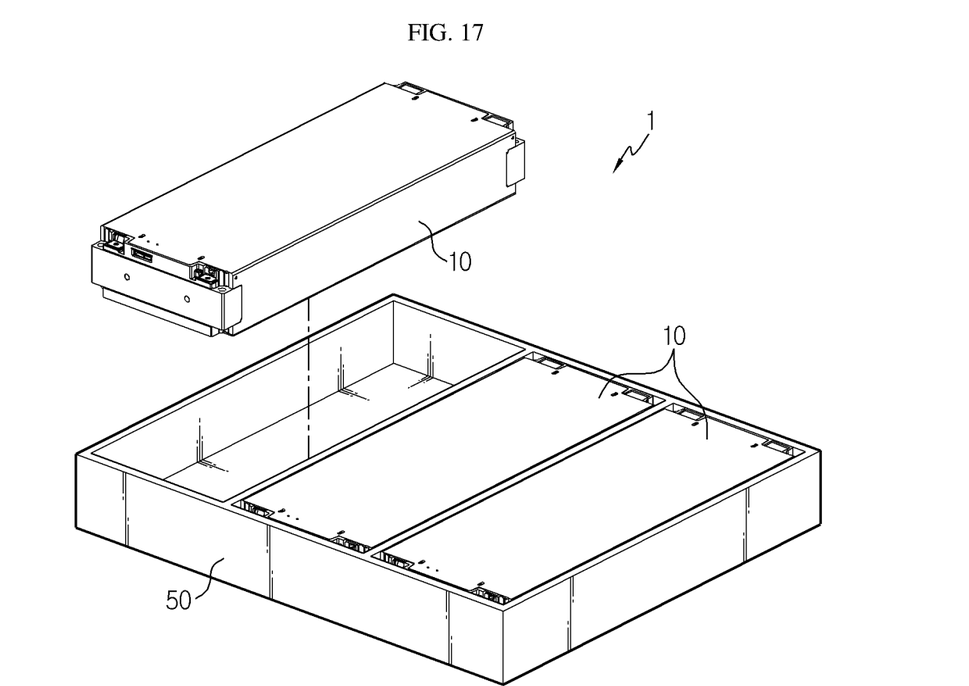
FIG. 17 is a diagram for illustrating a battery pack according to an embodiment of the present disclosure.
Figure 18:
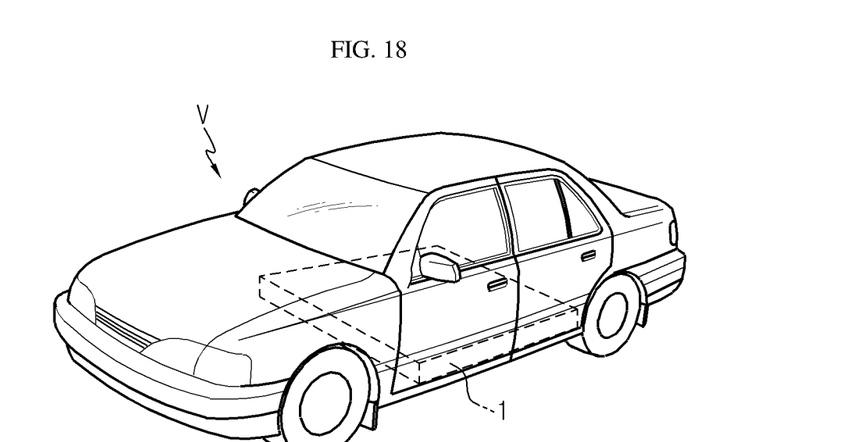
FIG. 18 is a diagram for illustrating a vehicle according to an embodiment of the present disclosure.

FIG. 17 is a diagram for illustrating a battery pack according to an embodiment of the present disclosure, and FIG. 18 is a diagram for illustrating a vehicle according to an embodiment of the present disclosure.

Referring to FIGS. 17 and 18, a battery pack 1 may include at least one battery module 10 according to the former embodiment and a pack case 50 for packaging the at least one battery module 10.

The battery pack 1 may be provided to a vehicle V as a fuel source of the vehicle V. As an example, the battery pack 1 may be provided to a vehicle V such as an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle V, which have the battery pack 1, include the battery module 10, 20 as described above, and thus it is possible to implement a battery pack 1 having all the advantages of the battery module 10, 20 described above, or devices, instruments, facilities or the like such as a vehicle V, which have the battery pack 1.

According to various embodiments as above, it is possible to provide the battery module 10, which may improve the efficiency of the assembling process, the battery pack 1 including the battery module 10, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells;
a base frame configured to support the plurality of battery cells;
a cover frame coupled to the base frame to cover the plurality of battery cells; and
a bus bar unit coupled to the cover frame in a tiltable manner, such that the bus bar unit can be pivoted between a first location fixed to the cover frame and a second location fixed to the base frame, the bus bar unit being electrically connected with the plurality of battery cells in the second location, wherein the first location is oriented at a predetermined angle relative to the second location, such that the bus bar unit is spaced away from the plurality of battery cells; and
a tension stopper configured to stably maintain the bus bar unit in the first location independent of any additional support provided to the busbar unit.

2. The battery module according to claim 1,
wherein the bus bar unit includes:
a bus bar housing pivotally coupled to the cover frame and fixable to the base frame; and
a connection bus bar connected to the bus bar housing and connectable to electrode leads of the plurality of battery cells.

3. The battery module according to claim 2,
wherein the bus bar housing has the tension stopper that is configured to engage a bottom portion of the cover frame when the bus bar unit is in the first location to maintain the bus bar housing spaced apart from the base frame at the predetermined angle.

4. The battery module according to claim 3,
wherein the tension stopper includes:
a protrusion protruding from the bus bar housing by a predetermined length;
a first bent portion extending from the protrusion at a first angle so as to contact a bottom surface of the cover frame when the bus bar unit is in the first location and so as to be spaced apart from the bottom surface of the cover frame when the bus bar unit is in the second location; and
a second bent portion extending from the first bent portion at a second angle so as to be spaced apart from the bottom surface of the cover frame when the bus bar unit is in the first location and so as to be disposed in contact with or adjacent to the bottom surface of the cover frame when the bus bar unit is in the second location.

5. The battery module according to claim 1,
wherein a bus bar housing has a guide projection arranged to guide movement of the bus bar unit to the second location.

6. The battery module according to claim 5,
wherein the cover frame has a guide groove into which the guide projection is received when the bus bar unit is pivoted from the first location toward the second location.

7. The battery module according to claim 2,
wherein the bus bar housing has a fixing hook arranged to fix the bus bar housing to the base frame when the bus bar unit is in the second location.

8. The battery module according to claim 7,
wherein the base frame has a hook insert groove into which the fixing hook is received when the bus bar unit is in the second location.

9. A battery pack, comprising:
at least one battery module according to claim 1; and
a pack case configured to receive the at least one battery module therein.

10. A vehicle, comprising:
at least one battery pack according to claim 9.

* * * * *